(12) United States Patent
Stegmiller

(10) Patent No.: US 9,545,990 B2
(45) Date of Patent: Jan. 17, 2017

(54) FLOOR PANEL RETENTION SYSTEM

(71) Applicant: The Boeing Company, Huntington Beach, CA (US)

(72) Inventor: Scott Gary Stegmiller, Lake Stevens, WA (US)

(73) Assignee: The Boeing Company, Chicago, IL (US)

( * ) Notice: Subject to any disclaimer, the term of this patent is extended or adjusted under 35 U.S.C. 154(b) by 159 days.

(21) Appl. No.: 14/548,949

(22) Filed: Nov. 20, 2014

(65) Prior Publication Data

US 2016/0144945 A1    May 26, 2016

(51) Int. Cl.
*B64C 1/00*    (2006.01)
*B64C 1/20*    (2006.01)

(52) U.S. Cl.
CPC ........................................ *B64C 1/20* (2013.01)

(58) Field of Classification Search
CPC ..................................... B64C 1/18; B64C 1/20
See application file for complete search history.

(56) References Cited

U.S. PATENT DOCUMENTS

| | | | |
|---|---|---|---|
| 4,077,590 A * | 3/1978 | Shorey | B64D 9/003 244/137.1 |
| 4,399,642 A | 8/1983 | Bard et al. | |
| 6,086,018 A * | 7/2000 | Gobeil | B60N 2/015 244/122 R |
| 7,073,994 B2 | 7/2006 | Huber et al. | |
| 8,157,210 B2 | 4/2012 | Huber et al. | |
| 8,240,606 B2 | 8/2012 | Westre et al. | |
| 8,561,946 B2 * | 10/2013 | Barmichev | B64C 1/20 244/118.1 |
| 2008/0302909 A1 | 12/2008 | Chrissos et al. | |
| 2008/0302913 A1 | 12/2008 | Griess et al. | |
| 2010/0230535 A1 | 9/2010 | Huber et al. | |

* cited by examiner

*Primary Examiner* — Philip J Bonzell
(74) *Attorney, Agent, or Firm* — Armstrong Teasdale LLP

(57) ABSTRACT

A floor panel assembly is used with a floor panel retention system that includes a first retaining element, a second retaining element, and a support element. The floor panel assembly includes a floor panel including a first side edge and an opposing second side edge. The floor panel is configured to rest on the support element. The floor panel assembly also includes at least one tab coupled to the floor panel proximate the first side edge. The tab is configured to engage the first retaining element. The floor panel assembly also includes a latch coupled to the floor panel proximate the second side edge. The latch is configured to selectively engage the second retaining element.

20 Claims, 8 Drawing Sheets

FLOOR PANEL RETENTION SYSTEM

BACKGROUND

The present invention relates generally to a floor panel retention system for a cargo storage area, and, more specifically, to a floor panel retention system that includes floor panels with slidable latches.

At least some known cargo storage facilities, such as vehicles (e.g., aircraft, ships, trucks, etc.) and storage locations (e.g., holds, containers, and warehouses, etc.) include cargo management systems to aid in the movement of cargo within the facility. Some such facilities, such as aircraft, include various compartments for different uses. One such compartment in an aircraft is a cargo storage area for carrying and storing cargo during flight. The cargo area includes structural supports that support the weight of the cargo. Existing cargo management systems typically include a number of roller trays coupled to the top of the support structures. Roller trays are used in storage facilities, such as aircraft, to aid in the loading/unloading of cargo and are oriented along a longitudinal axis of the aircraft.

At least some known cargo management systems also include floor panels coupled to the structural supports between adjacent roller trays. Typically, the floor panels are coupled to the structural supports by positioning the floor panel on the support, drilling holes through the support that are aligned with pre-drilled holes in the floor panel, and then inserting fasteners though the holes. This fastening process requires the installer to drill a large number of holes, insert and fasten a fastener into each of the holes, and to clean up the drill shavings after the holes were drilled. Furthermore, other work cannot be performed in the area of the drilling due to the size of the drilling equipment. As such, the fastener method is a time consuming and labor intensive process that often requires reworking due to hole tolerances and margin requirements, which increases the manufacturing costs.

Moreover, the fastener method of coupling the floor panels to the support structure also requires the use of backing plates for the fasteners, since the tension in the fastener holds the roller trays in position. This causes an increase in cost and weight because additional material is required to assemble the cargo management system.

BRIEF DESCRIPTION

In one aspect, a floor panel assembly for use with a floor panel retention system is provided. The floor panel retention system includes a first retaining element, a second retaining element, and a support element. The floor panel assembly includes a floor panel including a first side edge and an opposing second side edge. The floor panel is configured to rest on the support element. The floor panel assembly also includes at least one tab coupled to the floor panel proximate the first side edge. The tab is configured to engage the first retaining element. The floor panel assembly also includes a latch coupled to the floor panel proximate the second side edge. The latch is configured to selectively engage the second retaining element.

In another aspect, a floor panel retention system is provided. The floor panel retention system includes a floor beam and a plurality of roller trays coupled to the floor beam. The plurality of roller trays includes a first roller tray and an adjacent second roller tray. The floor panel retention system also includes a floor panel assembly removably coupled between the first and the second roller trays. The floor panel assembly includes a floor panel and a latch member coupled to the floor panel. The latch member is moveable between a first position and a second position such that the latch member is configured to be disengaged from the second roller tray in the first position and to engage the second roller tray in the second position.

In yet another aspect, a method of method of assembling a floor panel retention system is provided. The method includes engaging a first roller tray with a tab coupled to a floor panel. A latch member is then coupled to the floor panel and positioned in a first position. The method also includes positioning the floor panel on a floor beam such that the floor panel rests thereon. The latch member is then positioned in a second position such that the latch member engages a second roller tray.

The features, functions, and advantages that have been discussed can be achieved independently in various embodiments of the present invention or may be combined in yet other embodiments further details of which can be seen with reference to the following description and drawings.

DETAILED DESCRIPTION

The embodiments described herein relate to a floor retention system for use within a cargo storage area. In various embodiments, the floor retention system includes a floor panel having a tab and a latch coupled thereto. The tab is configured to engage a first roller tray. The latch that is moveable between a first position and a second position to selectively engage a second roller tray. In the first position, at least a portion of the latch is positioned within a notch formed in the floor panel such that when the floor panel is placed on a floor beam, the latch does not contact the second roller tray. When the floor panel is properly positioned, the latch is slid to the second position where a portion of the latch engages the second roller tray to secure the floor panel between the first and second roller trays. Therefore, the floor panel retention system described herein secures the floor panels in place by engaging the roller trays as retaining elements rather than positively fastening the floor panels to the floor beams.

Figure 1:
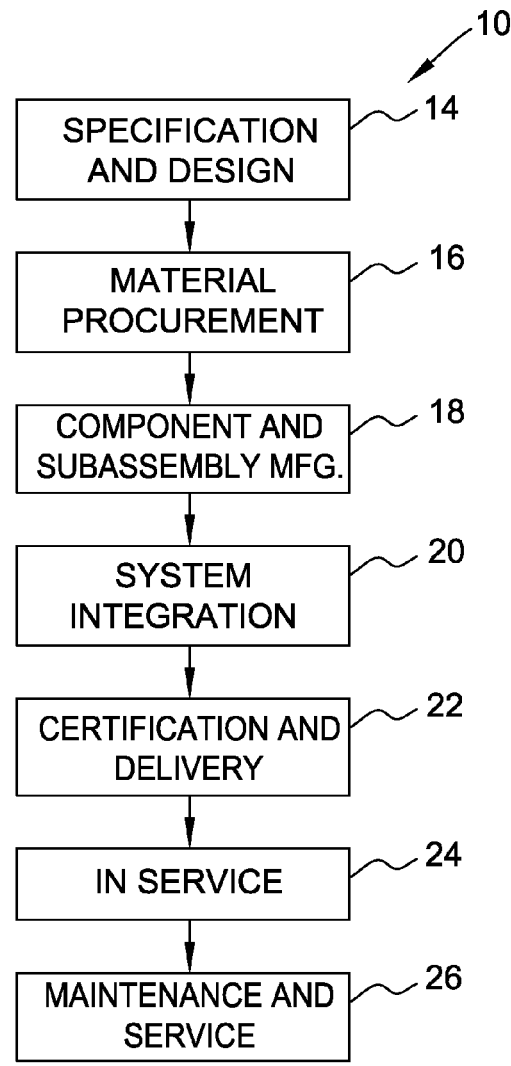
FIG. 1 is a flow diagram of an exemplary aircraft production and service methodology.
Figure 2:
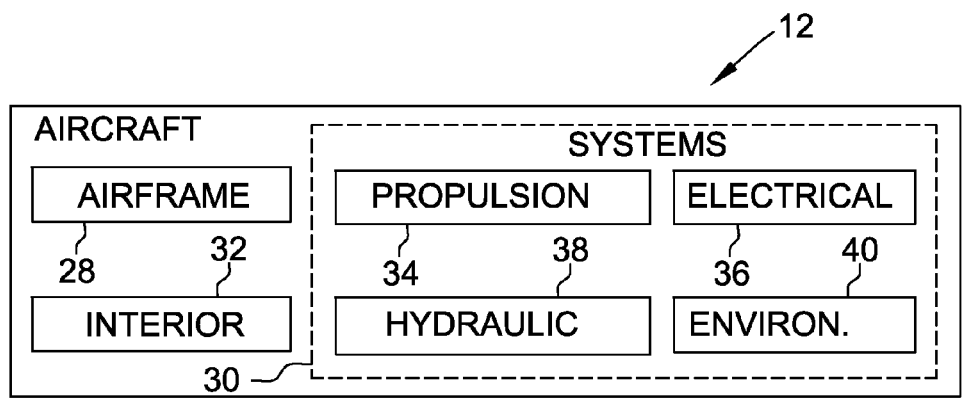
FIG. 2 is a block diagram of an exemplary aircraft.

Referring FIG. 1, implementations of the disclosure may be described in the context of an aircraft manufacturing and service method 10 and via an aircraft 12 (shown in FIG. 2). During pre-production, including specification and design 14 data of aircraft 12 may be used during the manufacturing process and other materials associated with the airframe may be procured 16. During production, component and subassembly manufacturing 18 and system integration 20 of aircraft 12 occurs, prior to aircraft 12 entering its certification and delivery process 22. Upon successful satisfaction and completion of airframe certification, aircraft 12 may be placed in service 24. While in service by a customer, aircraft 12 is scheduled for periodic, routine, and scheduled maintenance and service 26, including any modification, reconfiguration, and/or refurbishment, for example. In alternative implementations, manufacturing and service method 10 may be implemented via vehicles other than an aircraft.

Each portion and process associated with aircraft manufacturing and/or service 10 may be performed or completed by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 2, aircraft 12 produced via method 10 may include an airframe 28 having a plurality of systems 30 and an interior 32. Examples of high-level systems 30 include one or more of a propulsion system 34, an electrical system 36, a hydraulic system 38, and/or an environmental system 40. Any number of other systems may be included.

Apparatus and methods embodied herein may be employed during any one or more of the stages of method 10. For example, components or subassemblies corresponding to component production process 18 may be fabricated or manufactured in a manner similar to components or subassemblies produced while aircraft 12 is in service. Also, one or more apparatus implementations, method implementations, or a combination thereof may be utilized during the production stages 18 and 20, for example, by substantially expediting assembly of, and/or reducing the cost of assembly of aircraft 12. Similarly, one or more of apparatus implementations, method implementations, or a combination thereof may be utilized while aircraft 12 is being serviced or maintained, for example, during scheduled maintenance and service 26.

As used herein, the term "aircraft" may include, but is not limited to, airplanes, unmanned aerial vehicles (UAVs), gliders, helicopters, spacecraft, reusable launch vehicles, and/or any other object that travels through airspace. Further, in an alternative implementation, the aircraft manufacturing and service method described herein may be used in any manufacturing and/or service operation.

Figure 3:
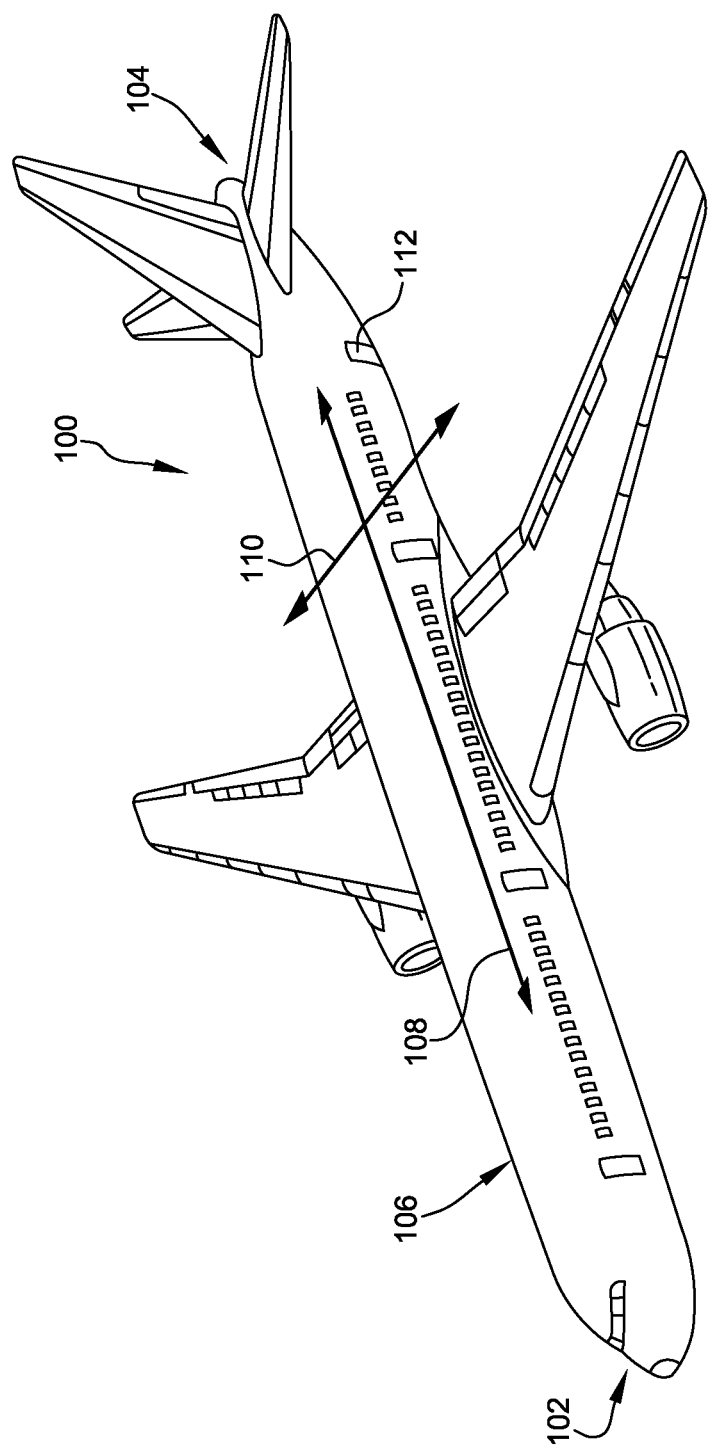
FIG. 3 illustrates an exemplary aircraft.

With reference now to FIG. 3, an illustration of an aircraft 100 is depicted in accordance with an advantageous embodiment. Aircraft 100 may be aircraft 12, as described above. In the exemplary implementation, aircraft 100 includes a nose portion 102, a tail portion 104, and a fuselage 106 extending therebetween. Aircraft 100 also includes a longitudinal axis 108 extending along fuselage 106 and a transverse axis 110 extending across fuselage 106, perpendicular to longitudinal axis 108. Moreover, aircraft 100 also includes a cargo opening 112. Opening 112 may be positioned in other locations on aircraft 100 than as depicted in FIG. 3. Opening 112 provides entry to at least one of a cargo area, passenger cabin, cockpit, or other area of aircraft 100.

Although aircraft 100 generally illustrates a commercial passenger aircraft, it is understood that the various embodiments of the present invention may also be incorporated into flight vehicles of other types. Examples of such flight vehicles may include cargo aircraft, manned or unmanned military aircraft, rotary wing aircraft, ballistic flight vehicles, or orbital vehicles. Additionally, those skilled in the art will readily recognize that the various embodiments of the present invention may also be incorporated into terrestrial or marine vehicles, cargo containers, or stationary facilities, such as, but not limited to, warehouses.

Figure 4:
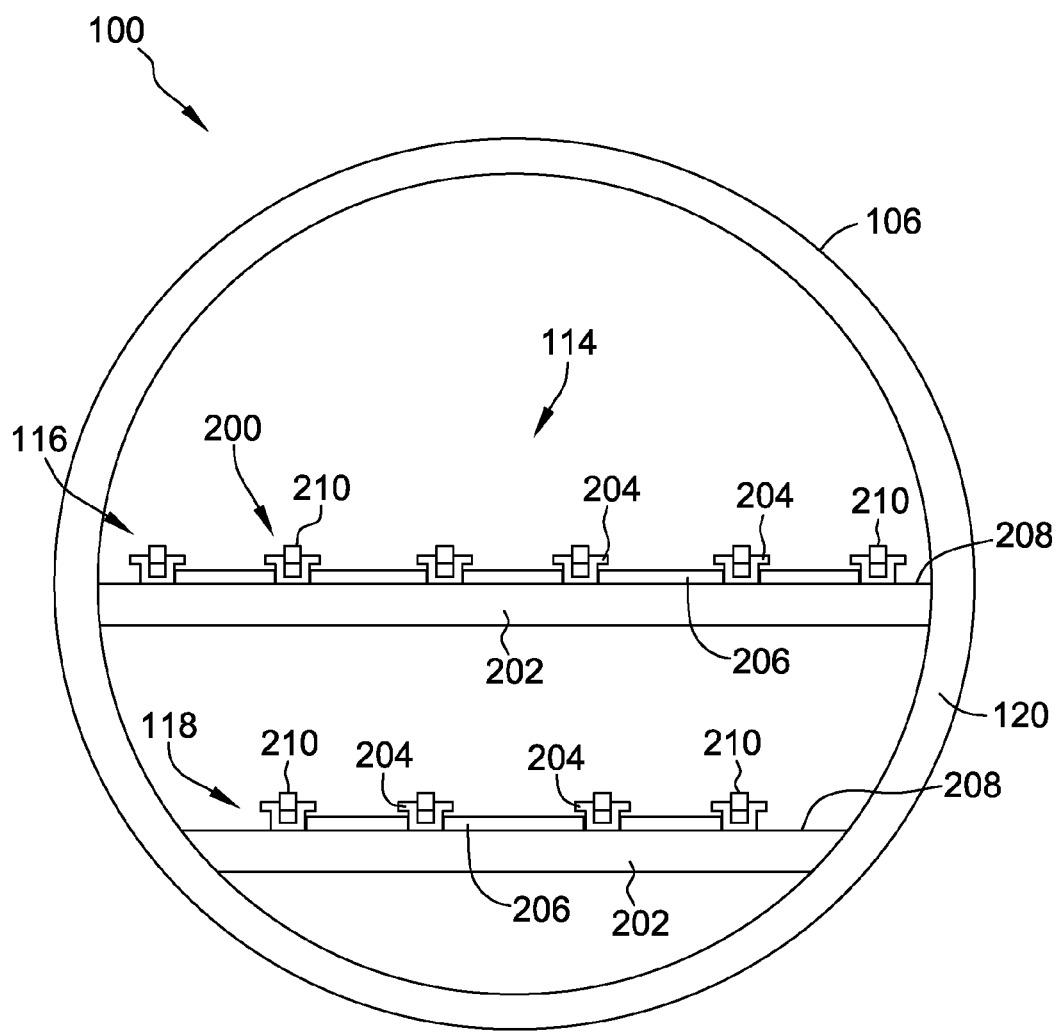
FIG. 4 is a cross-sectional view of the aircraft shown in FIG. 3 illustrating a cargo storage area that includes an exemplary floor panel retention system.
Figure 5:
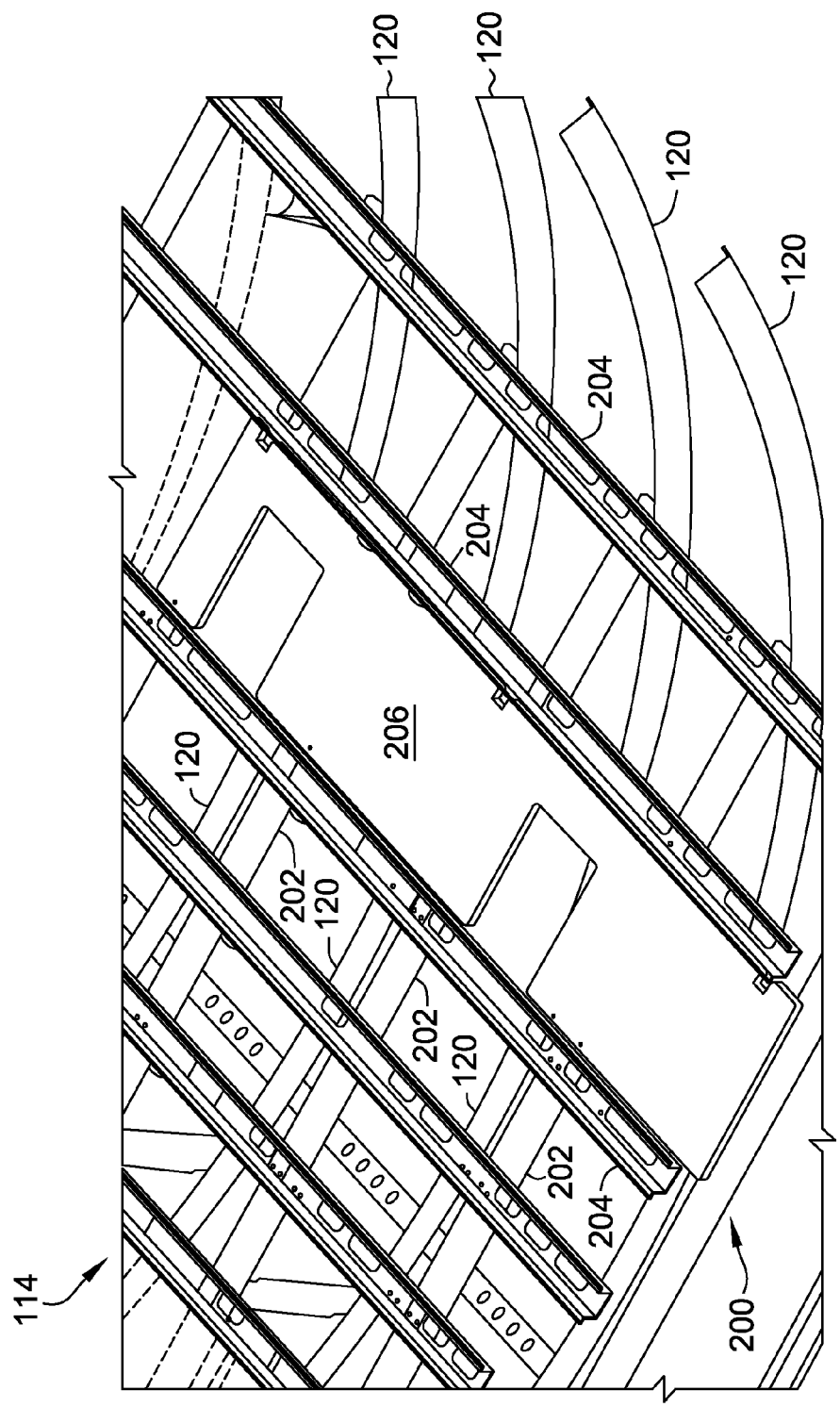
FIG. 5 is a perspective view of the cargo storage area shown in FIG. 4 illustrating the floor panel retention system.

FIG. 4 is a cross-sectional view of aircraft 100 illustrating a cargo storage area 114 that includes an exemplary floor panel retention system 200. FIG. 5 is a perspective view of cargo storage area 114 illustrating floor panel retention system 200. In an exemplary implementation, cargo storage area 114 includes an upper deck 116 and a lower deck 118 that is substantially similar in configuration and operation to upper deck 116. Each deck 116 and 118 extends transversely between a plurality of frame members 120 of fuselage 106. Alternatively, cargo storage area 114 includes additional or fewer cargo decks than cargo decks 114 and 116.

In the exemplary implementation, floor panel retention system 200 includes a plurality of transversely extending floor beams 202, a plurality of longitudinally extending roller trays 204, and a longitudinally extending floor panel 206 positioned between each pair of adjacent roller trays 204. Floor beams 202 provide a structural support for roller trays 204 and floor panels 206 such that both roller trays 204 and floor panels 206 are in contact with a top surface 208 of at least one of the plurality of transverse floor beams 202. In some implementations, floor beams 202 may include a notch (not shown) that receives at least a portion of at least one of a roller tray 204 and a floor panel 206. Floor panels 206 provide support for the cargo and also for personnel handling the cargo. Each roller tray 204 includes a plurality of rollers 210 that allow movement of cargo within storage area 114 along axis 108 when a force is applied to the cargo. In the exemplary implementation, rollers 210 include cylindrical rollers that allow the cargo to move in a direction, such as a direction along axis 108 in FIG. 3. Alternatively or in combination, rollers 210 are spherical balls that rotate about any axis, allowing the cargo to move within storage area 114 in any direction.

Figure 6:
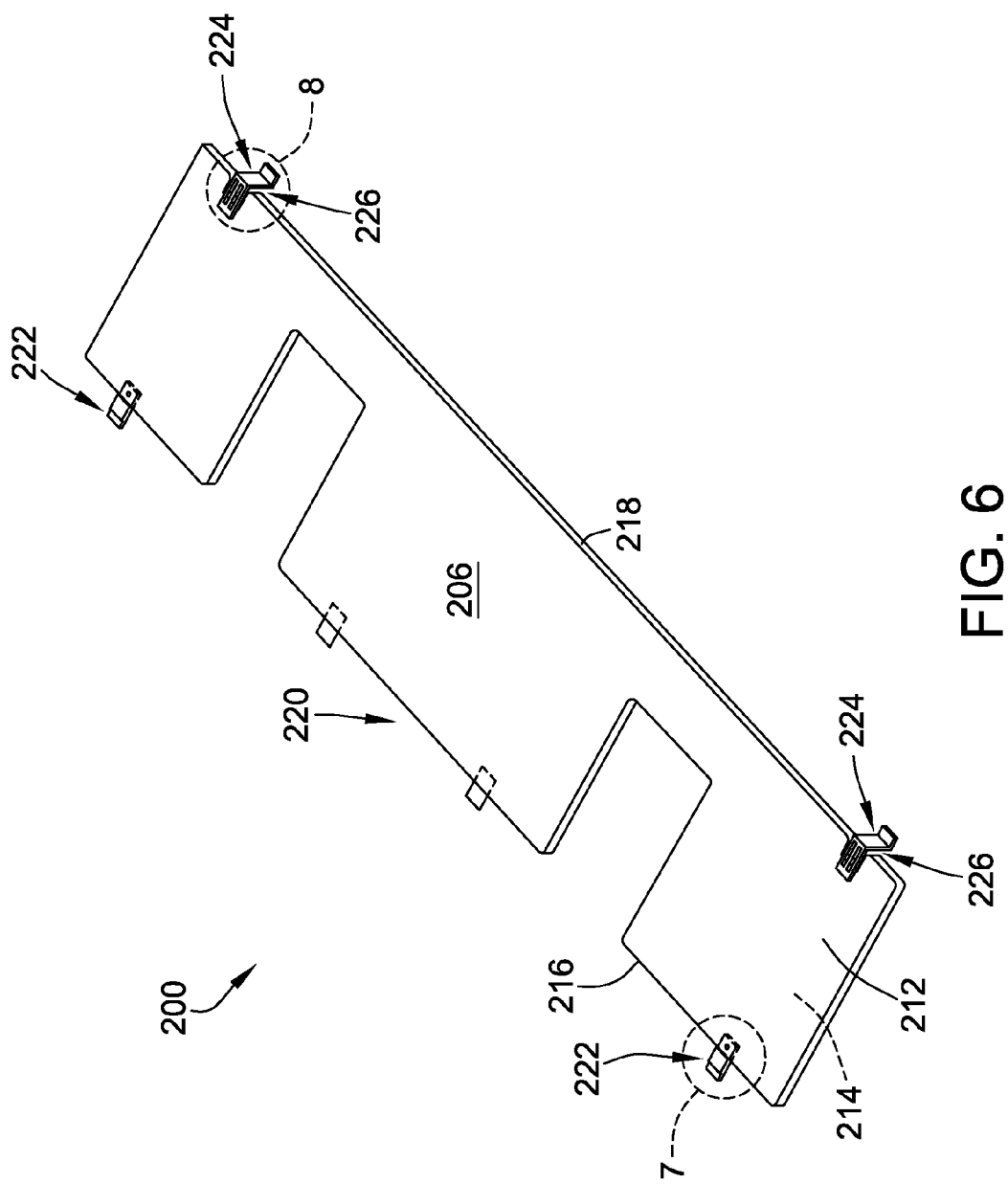
FIG. 6 is a perspective view of a floor panel from the floor panel retention system shown in FIG. 5.

FIG. 6 is a perspective view of an exemplary floor panel 206 from floor panel retention system 200 shown in FIG. 5. Floor panel 206 includes a top surface 212, an opposing bottom surface 214, a first side edge 216, and an opposing second side edge 218. Although FIG. 6 illustrates floor panel 206 as having two openings defined in first side edge 216, floor panel 206 may be substantially rectangular such that first side edge 216 is a substantially continuous straight line. In the exemplary implementation, floor panel 206 is not coupled to floor beams 202 by any mechanical or bonding means, such as, but not limited to fasteners, adhesives, or welding, such that bottom surface 214 merely rests on top surface 208 of floor beams 202 (both shown in FIG. 4).

In the exemplary implementation, floor panel 206 also includes at least one pair of alignment members 220 coupled to at least first side edge 216 of panel 206. Alternatively, or in combination, alignment members 220 are coupled to second side edge 218. In the exemplary implementation, members 220 are spaced apart a distance that equals a width of one floor beam 202 such that alignment members 220 straddle beam 202 to prevent longitudinal movement of floor panel 206. Alternatively, or in combination, alignment members 220 are positioned at any beam 202 and are not restricted to being positioned on opposite sides of the same beam 202. More specifically, in such a configuration, a first alignment member 220 is positioned to engage a forward side of a beam 202 and a second alignment member 220 is positioned to engage an aft side of the same or a different floor beam 202.

In the exemplary implementation, floor panel 206 also includes at least one tab 222 coupled to panel 206 proximate first edge 216 and at least one latch 224 coupled to panel 206 proximate second side edge 218. More specifically, each tab 222 is coupled to bottom surface 214 of floor panel 206 and extends outwardly therefrom, and each latch 224 is coupled to top surface 212 of floor panel 206 and extends partially toward bottom surface 214 and partially outwards from second side edge 218. Furthermore, floor panel 206 includes a notch 226 formed therein for each respective latch 224 such that notch 226 is configured to receive a portion of latch 224.

Figure 7:
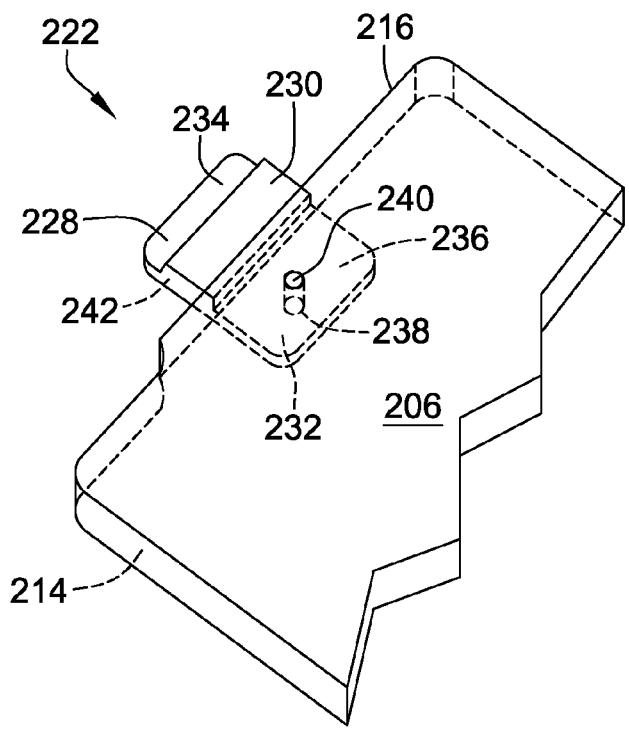
FIG. 7 is an enlarged view of a portion of the floor panel shown in FIG. 6.

FIG. 7 is an enlarged view of a portion of floor panel 206 as indicated by circle 7-7 illustrating tab 222. In the exemplary implementation, tab 222 includes a first lip 228, a body portion 230, and a second lip 232. First lip 228 includes a top surface 234 that engages roller tray 204 (shown in FIG. 5) and second lip 232 includes a top surface 236 that engages bottom surface 214 of floor panel 206. Second lip 232 also includes an opening 238 that is concentric with an opening 240 defined in floor panel 206. Openings 238 and 240 are configured to receive a fastener (not shown) therethrough to couple tab 222 to floor panel 206. Alternatively, tab 222 is coupled to floor panel 206 using any means, such as, but not limited to, bonding, that facilitates operation of floor panel retention system 200 as described herein. Furthermore, tab 222 may be integrally formed with floor panel 206. Body portion 230 extends between lips 228 and 232 and includes a thickness that is greater than the thicknesses of both lips 228 and 232. Furthermore, body portion 230 acts as a spacer between floor panel 206 and roller tray 204 when floor panel retention system 200 is assembled, as described in further detail below. Tab 222 also includes a bottom surface 242 that is substantially continuous along lips 228 and 232 and body portion 230 such that bottom surface 242 is parallel to bottom surface 214 of floor panel 206. In the exemplary implementation, as described in further detail below, bottom surface 242 is positioned below bottom surface 214 of floor panel 206. Alternatively, floor panel 206 includes a recess that receives second lip 232 of tab 222 such that bottom surfaces 214 and 242 are coplanar.

Figure 8:
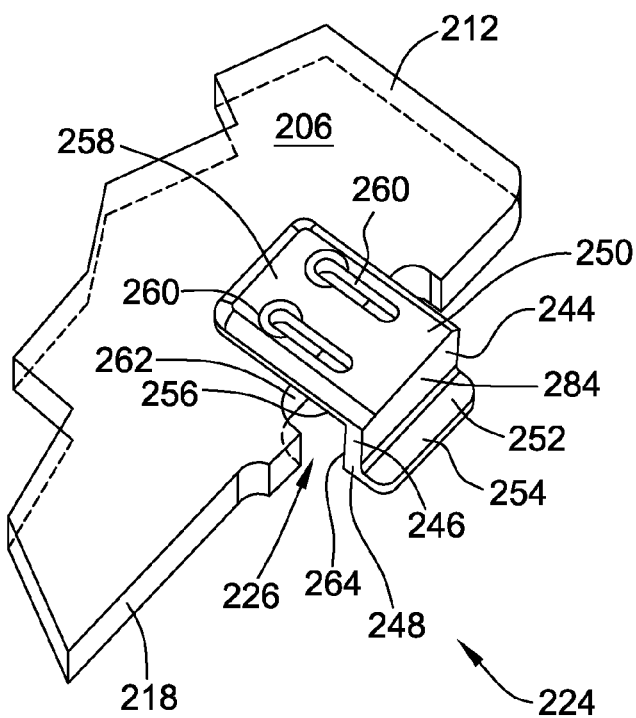
FIG. 8 is an enlarged view of another portion of the floor panel shown in FIG. 6.

FIG. 8 is an enlarged view of a portion of floor panel 206 as indicated by circle 8-8 illustrating latch 224. In the exemplary implementation, latch 224 includes a body portion 244 having a first end 246 and a second end 248. Latch also includes a flange 250 extending substantially perpendicularly from body portion first end 246 and a lip 252 extending substantially perpendicularly from body portion second end 248 in a direction opposite that of flange 250. Lip 252 of latch 224 includes a top surface 254 that engages a portion of roller tray 204 when floor panel retention system 200 is assembled. In the exemplary implementation, latch 224 is coupled to floor panel 206 via flange 250. More specifically, a bottom surface 256 of flange 250 is coupled to top surface 212 of floor panel 206 such that a top surface 258 of flange 250 and top surface 212 are offset. Alternatively, floor panel 206 includes a recess that receives a portion of flange 250 such that top surfaces 258 and 212 are substantially coplanar.

Flange 250 also includes at least one slot 260 formed therein. In the exemplary implementation, each slot 260 is aligned with an opening (not shown in FIG. 8) formed in floor panel 206 such that slots 260 and the openings are configured to receive a fastener (not shown in FIG. 8) therethrough. More specifically, as described in further detail below, slots 260 enable slidable movement of latch 224 between a first position and a second position along floor panel 206 to properly position latch 224 and floor panel 206 with respect to roller tray 204 (shown in FIG. 5) when floor panel retention system 200 is assembled.

In the exemplary implementation, notch 226 extends into floor panel 206 a predetermined depth to allow latch 224 to slide inward, that is, toward first side edge 216, to enable installation of floor panel 206 into floor panel retention system 200. Notch 226 includes a notch edge 262 that is offset a predetermined distance from second side edge 218. Body portion 244 of latch 224 includes a side surface 264 that is spaced a first distance from notch edge 262 in a first position and a second distance from notch edge 262 in a second position, where the second distance is greater than the first distance, as described in further detail below.

Figure 9:
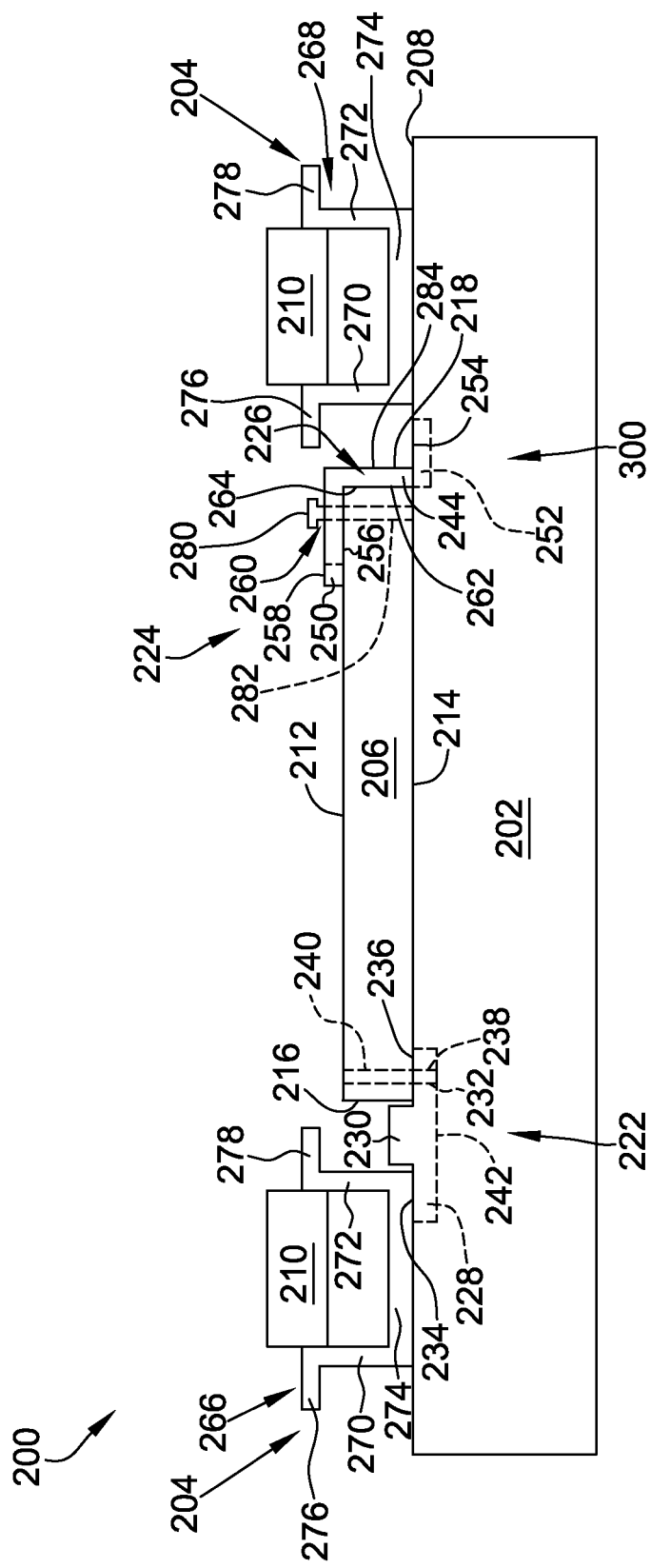
FIG. 9 is a cross-sectional view of the floor panel retention system shown in FIG. 5 in a first position.
Figure 10:
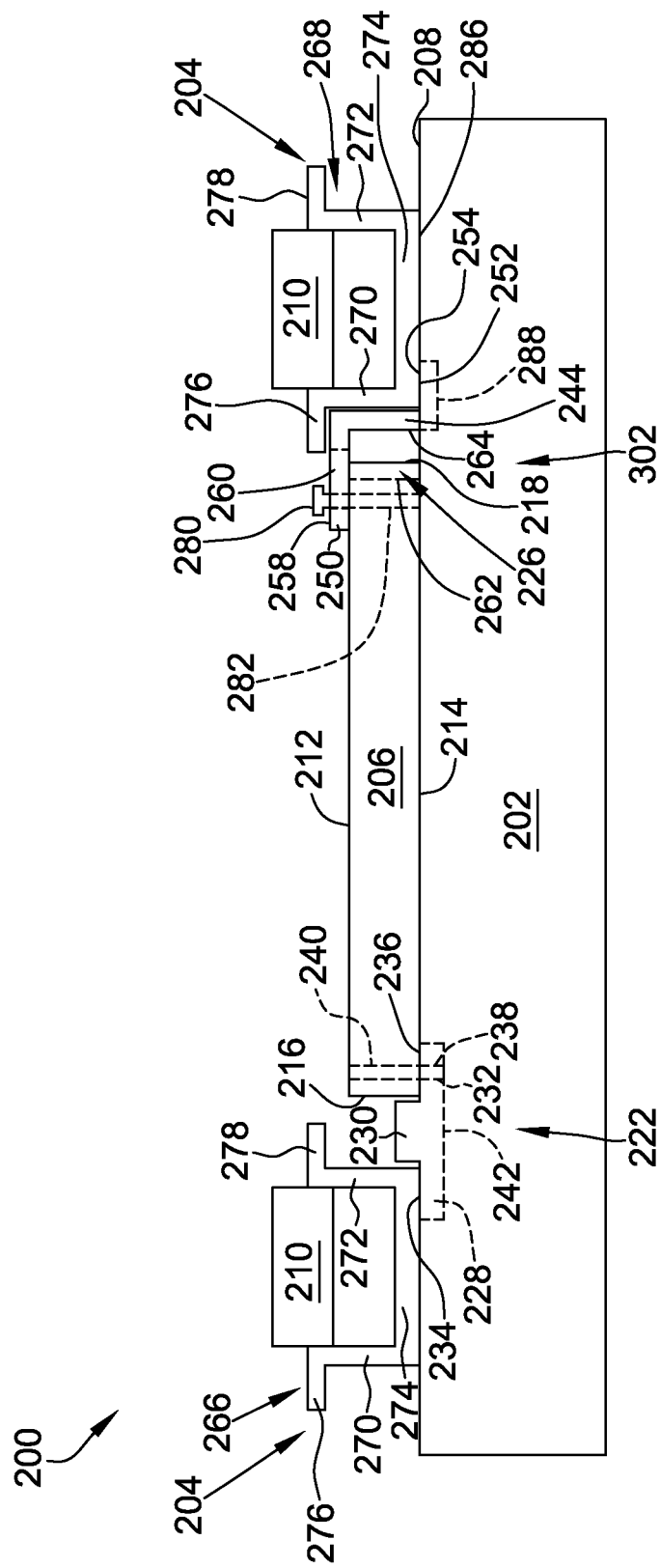
FIG. 10 is a cross-sectional view of the floor panel retention system shown in FIG. 5 in a second position.

FIG. 9 is a cross-sectional view of floor panel retention system 200 in a first position 300. FIG. 10 is a cross-sectional view of floor panel retention system 200 in a second position 302. As described above, floor panel retention system 200 includes floor beam 202, roller trays 204, and floor panel 206. More specifically, floor panel 206 is positioned between a first roller tray 266 and an adjacent second roller tray 268 of the plurality of roller trays 204. Each tray 204 includes a substantially U-shaped cross-section that includes a first sidewall 270, a second sidewall 272, and a bottom wall 274 extending therebetween. In the exemplary implementation, bottom wall 274 is coupled to top surface 208 of floor beam 202. Alternatively, floor beam 202 includes a notch (not shown) that receives a portion of roller trays 204 therein. First sidewall 270 includes a first lip 276 extending perpendicularly therefrom in a direction opposite that of bottom wall 274. Similarly, second sidewall 272 includes a second lip 278 extending perpendicularly therefrom in a direction opposite that of bottom wall 274.

In the exemplary implementation, tabs 222 and latches 224 of floor panel 206 are coupled to, or engage, first roller tray 266 and second roller tray 268, respectively, to retain floor panel 206 within floor panel retention system 200 without requiring each floor panel 206 to be positively coupled, via fasteners, bonding, or any other coupling method, to floor beams 202. More specifically, tab 222 includes opening 238 that is aligned with opening 240 in floor panel 206 such that a fastener (not shown) is used to couple tab 222 to floor panel 206. Alternatively, tab 222 is coupled to floor panel 206 via any method that facilitates operation of floor panel retention system 200 as described herein, such as, but not limited to, bonding or integrally forming tab 222 with panel 206. In the exemplary implementation, top surface 234 of tab first lip 228 is coupled to, or engages, a bottom surface 286 of bottom wall 274 of first roller tray 266 such that top surfaces 234 and 208 of lip 228 and floor beam 202, respectively, are substantially coplanar. Alternatively, tab first lip 228 is positioned within a recess (not shown) formed at an intersection of walls 272 and 274 of first roller tray 266 such that bottom surface 242 of tab 222 and top surface 208 of floor beam 202 are substantially coplanar. In another alternative implementation, tab first lip 228 engages an under surface of second sidewall second lip 278.

A fastener 280 extends through slot 260 of latch flange 250 and into an opening 282 defined in floor panel 206. In the first position 300, shown in FIG. 9, fastener 280 is loosened to enable flange 250 to slide along floor panel 206 toward first side edge 216 such that body portion 244 of latch 224 is positioned at least partially within notch 226 defined in second side edge 218 of floor panel 206. In one implementation, side surface 264 of body portion 244 contacts notch surface 262 and a second side surface 284 of body portion 244 is substantially coplanar with second side edge 218 of floor panel 206. Alternatively, surfaces 262 and 264 are spaced a first distance apart and/or surface 284 is not coplanar with edge 218 in the first position 300. Generally, latch 224 is positioned within notch 226 such that lip 252 of latch 224 does not contact first lip 276 of roller tray first sidewall 270 when floor panel 206 is rotated into position, as described in further detail below.

In the second position 302, as shown in FIG. 10, latch flange 250 is slid toward second roller tray 268 such that side surface 264 of body portion 244 is spaced a second distance from notch surface 262 that is greater than the first distance, when latch 224 is in the first position 300. In the exemplary implementation, when latch 224 is in the second position 302, top surface 254 of latch lip 252 is coupled to, or engages, a bottom surface 286 of bottom wall 274 of second roller tray 268 such that top surfaces 254 and 208 of lip 252 and floor beam 202, respectively, are substantially coplanar. Alternatively, latch lip 252 is positioned within a recess (not shown) formed at an intersection of walls 270 and 274 of second roller tray 268 such that a bottom surface 288 of lip 252 and top surface 208 of floor beam 202 are substantially coplanar. In another alternative implementation, latch lip 252 engages an under surface of first sidewall first lip 276. Once latch 224 is in the second position 302 and latch lip 252 is secured beneath a portion of second roller tray 268, fastener 280 is then tightened to secure latch 224 in place and prevent further movement of latch 224.

Assembly of floor panel retention system 200 begins with coupling tab 222 and latch 224 to floor panel 206. More specifically, latch 224 is coupled to floor panel 206 by inserting fastener 280 through slot 260 in latch flange 250 and into opening 282 in floor panel 206. Once latch 224 is coupled to floor panel 206, latch 224 is slid to the first position 300. More specifically, latch 224 is slid inward toward first side edge 216 such that at least a portion of body portion 244 is positioned within notch 226. Slots 260, in latch flange 250, slide along stationary fastener 280 to enable proper placement of latch 224. In the first position 300, side surface 264 of body portion 244 is spaced a first distance from notch surface 262.

Alignment members 220 (shown in FIG. 6) are then aligned with one or more floor beams 202 to prevent longitudinal movement of floor panel 206. Floor panel 206 is then tilted an angle with respect to floor beam 202 and first edge 216 of floor panel 206, having tab 222 coupled thereto, is inserted between adjacent roller trays 266 and 268 such that tab 222 engages first roller tray 266. More specifically, in the exemplary implementation, first edge 216 is inserted such that tab first lip 228 couples to and engages bottom wall 274 of first roller tray 266. Alternatively, tab first lip 228 couples to and engages second lip 278 of first roller tray second sidewall 272. In the exemplary implementation, tab 222 is not positively fastened to first roller tray 266 such that floor panel 206 is easily and quickly removable.

When tab 222 is properly positioned, second side edge 218, having latch 224 coupled thereto, is lowered such that floor panel 206 is substantially parallel to floor beam 202. In the first position 300, latch 224 is slid inward to avoid latch lip 252 contacting first sidewall first lip 276 of second roller tray 268. In such a configuration, floor panel 206 rests on top surface 208 and is supported by floor beam 202. In the exemplary implementation, floor panel 206 is not positively fastened to floor beam 202, therefore making floor panel 206 easily and quickly removable. That is, floor panel 206 and floor beam 202 are not coupled together mechanically, bondedly, or any other manner. Floor panel 206 merely rests on top of and is supported by floor beam 202. As such, no holes need be drilled into floor panel 206 or floor beams 202 to receive a fastener therethrough for coupling floor beam 202 to floor panel 206.

Once floor panel 206 is supported by floor beam 202, latch 224 is slid to the second position 302 to engage second roller tray 268. More specifically, in the exemplary implementation, latch 224 is slid toward second roller tray 268 such that latch lip 252 is positioned beneath bottom wall 274 of second roller tray 268. Alternatively, latch lip 252 is positioned beneath first lip 276 of second roller tray first sidewall 270. In the exemplary implementation, latch lip 252 is not positively fastened to second roller tray 268 such that floor panel 206 is easily and quickly removable. Slots 260, in latch flange 250, slide along stationary fastener 280 to enable proper placement of latch 224. In the second position 302, side surface 264 of latch body portion 244 is spaced a second distance from notch surface 262 that is greater than the first distance when latch 224 is in the first position 300. Fastener 280 is then tightened to hold latch 224 in the second position 302 and secure floor panel 206 in place between roller trays 266 and 268.

Floor panel 206 is easily removable by loosening fastener 280, sliding latch 224 back into the first position 300, lifting second side edge 218 of floor panel 206 by pivoting floor panel 206 proximately about first side edge 216 such that latch lip 252 clears first lip 276 of second roller tray first sidewall 270, and then removing first side edge 216 from between roller trays 266 and 268.

In one application, the described embodiments may be utilized as part of a floor panel retention system with a cargo storage area. The described embodiments are directed to a floor panel retention system that includes a plurality of transverse floor beams, a plurality of longitudinal roller trays, and a floor panel coupled between a pair of adjacent roller trays. The floor panels each include at least one tab that is configured to engage a first roller tray. The floor panels also include at least one latch that is moveable between a first position and a second position to selectively engage a second roller tray. In the first position, at least a portion of the latch is positioned within a notch formed in the floor panel such that when the floor panel is placed on the floor beam, the latch does not contact a second roller tray that is adjacent the first roller tray. When the floor panel is properly positioned, the latch is slid to the second position where a portion of the latch engages the second roller tray to secure the floor panel between the first and second roller trays.

Therefore, the floor panel retention system described herein secures the floor panels in place by engaging the roller trays as retaining elements rather than positively fastening the floor panels to the floor beams. As such, the floor beams provide support to the floor panels, but are not coupled thereto using mechanical fasteners or a bonding method. The implementations described herein eliminate the drilling of a large amount of holes in the floor panels and floor beams that would conventionally be used to receive a fastener therethrough. Therefore, the floor panel retention system described herein is a low cost and lightweight method to retain the floor panels within the cargo storage area and provide self-locating features and positive positioning of the floor panels while also allowing for quick installation and removal of the floor panels as desired.

This written description uses examples to disclose various embodiments, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A floor panel assembly for use with a floor panel retention system that includes a first retaining element, a second retaining element, and a support element, said floor panel assembly comprising:
   a floor panel comprising a bottom surface, a first side edge and an opposing second side edge, said bottom surface of said floor panel configured to rest on the support element;
   at least one tab coupled to and extending horizontally outward from said floor panel proximate said first side edge, said tab configured to engage the first retaining element; and
   a latch coupled to and extending horizontally outward from said floor panel proximate said second side edge, said latch configured to selectively engage the second retaining element, said latch moveable between a first position including a first distance from said second side edge and a second position including a second distance from said second side edge, the second distance greater than the first distance.

2. The floor panel assembly in accordance with claim 1 further comprising a plurality of alignment members coupled to said floor panel, said alignment members configured to engage the support element.

3. The floor panel assembly in accordance with claim 1, wherein said latch comprises:
   a body portion including a first end and a second end;
   a flange extending from said body portion first end, said flange coupled to said floor panel; and
   a lip extending from said body portion second end, said lip configured to engage the second retaining element.

4. The floor panel assembly in accordance with claim 1, wherein said latch is configured to be disengaged from the second retaining element in the first position and to engage the second retaining element in the second position.

5. The floor panel assembly in accordance with claim 4, wherein said second side edge includes a notch formed therein that receives at least a portion of said latch when said latch is in the first position.

6. The floor panel assembly in accordance with claim 1, wherein said tab comprises a first lip configured to engage the first retaining element and a second lip coupled to said floor panel.

7. The floor panel assembly in accordance with claim 6, wherein said tab comprises a body portion between said first and said second lip, said body portion configured to space said floor panel from the first retaining element.

8. A floor panel retention system comprising:
   a floor beam;
   a plurality of roller trays coupled to said floor beam, said plurality of roller trays comprising a first roller tray and an adjacent second roller tray; and
   a floor panel assembly removably coupled between said first and said second roller trays, said floor panel assembly comprising:
   a floor panel; and
   a latch member coupled to and extending horizontally outward from said floor panel, wherein said latch member is moveable between a first position including a first distance from a side edge of said floor panel and a second position including a second distance from the side edge of said floor panel, the second distance greater than the first distance, wherein said latch member is configured to be disengaged from said second roller tray in the first position and to engage said second roller tray in the second position.

9. The floor panel retention system in accordance with claim 8, wherein said floor panel includes a notch formed therein that receives at least a portion of said latch member when said latch member is in the first position.

10. The floor panel retention system in accordance with claim 8 further comprising a plurality of alignment members coupled to said floor panel, said alignment members configured to engage said floor beam.

11. The floor panel retention system in accordance with claim 8, wherein said latch member comprises a flange coupled to said floor panel, said flange comprising at least one slot defined therein.

12. The floor panel retention system in accordance with claim 8, wherein said latch member comprises a lip configured to engage the second roller tray when said latch member is in the second position.

13. The floor panel retention system in accordance with claim 8 further comprising at least one tab coupled to said floor panel, said tab configured to engage said first roller tray.

14. The floor panel retention system in accordance with claim 13, wherein said at least one tab comprises a first lip configured to engage the first roller tray and a second lip coupled to said floor panel.

15. A method of assembling a floor panel retention system, said method comprising:
   engaging a first roller tray with a tab coupled to and extending horizontally outward from a first side edge of a floor panel;
   positioning a latch member in a first position extending horizontally outward from a second side edge of the floor panel, the second side edge opposite the first side edge, wherein the first position includes a first distance from the second side edge;
   positioning the floor panel on a floor beam such that the floor panel rests thereon; and
   positioning the latch member in a second position such that the latch member engages a second roller tray, the second position including a second distance from the second side edge of the floor panel, the second distance greater than the first distance.

16. The method in accordance with claim 15 further comprising aligning a plurality of alignment members with the floor beam.

17. The method in accordance with claim 15, wherein positioning a latch member in a first position comprises sliding the latch member toward the tab such that at least a portion of the latch member is positioned within a notch formed in a side edge of the floor panel.

18. The method in accordance with claim 15, wherein positioning the latch member in a second position such that the latch member engages a second roller tray comprises positioning the latch member in a second position such that a lip of the latch member engages the second roller tray.

19. The method in accordance with claim 15 further comprising securing a flange of the latch member to the floor panel when the latch member is in the second position.

20. The method in accordance with claim 19, wherein securing a flange comprises tightening a fastener that extends through a slot formed in a flange of the latch member.

\* \* \* \* \*